L. C. MARSHALL.
PISTON RING.
APPLICATION FILED MAY 4, 1920.

1,367,405.

Patented Feb. 1, 1921.

Inventor
Lewis C. Marshall
by Roberts, Roberts & Cushman
his Attorneys

UNITED STATES PATENT OFFICE.

LEWIS C. MARSHALL, OF WALPOLE, MASSACHUSETTS, ASSIGNOR TO PRESSURE PROOF PISTON RING COMPANY, OF BOSTON, MASSACHUSETTS, A CORPORATION OF MASSACHUSETTS.

PISTON-RING.

1,367,405.  Specification of Letters Patent.  Patented Feb. 1, 1921.

Application filed May 4, 1920. Serial No. 378,827.

*To all whom it may concern:*

Be it known that I, LEWIS C. MARSHALL, a citizen of the United States, and resident of Walpole, in the county of Norfolk and State of Massachusetts, have invented new and useful Improvements in Piston-Rings, of which the following is a specification.

My invention relates to ring-packing for pistons, and consists in improvements of which the objects are, to provide a symmetrically sectioned expanding ring having a maximum of effective resilient material in the space available, to prevent the packing ring sections from chattering in the groove and thus breaking the pressure-tight contact which should be preserved between the ring sections and the plane surfaces of the piston groove, to hold one of said ring sections with an approximation to complete positiveness, on its bearing against the plane face of the piston groove, to reconcile ample thickness of packing ring sections with ample cross-section of expanding ring, and thus obtain the practical advantages of both features, and in general to provide easily assembled packing-members having substantial proportions and durability.

Figure 1:
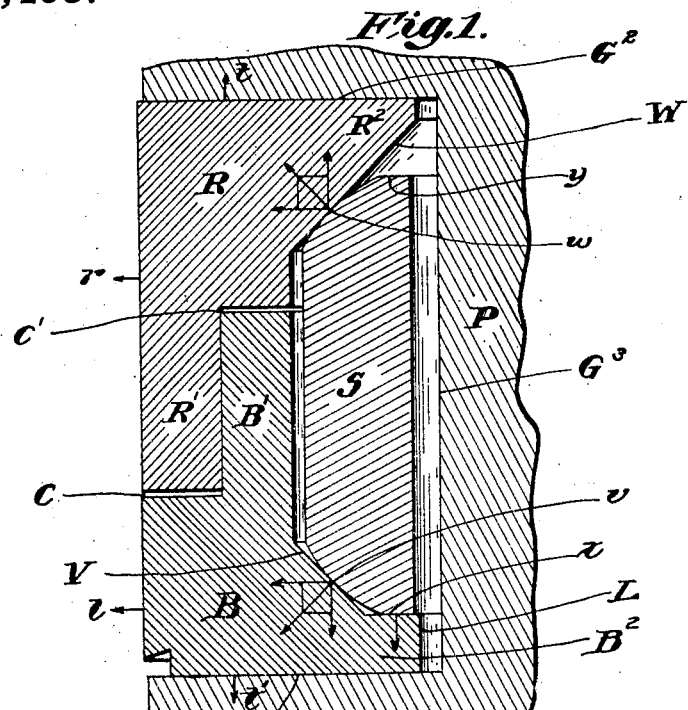
Figure 2:
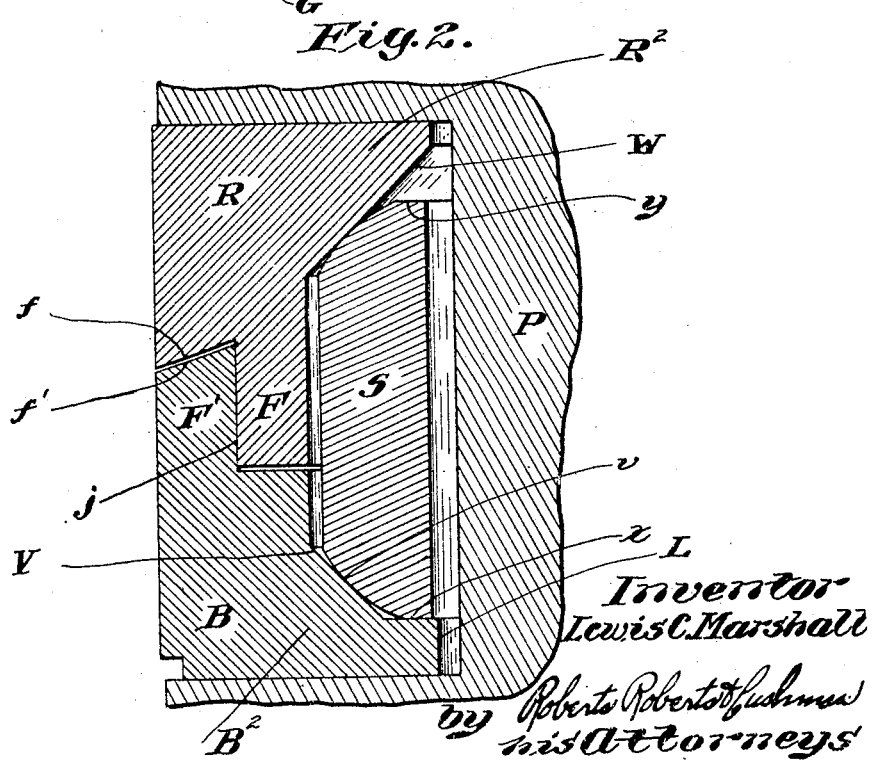

In the drawings hereto annexed, which illustrate, in section, on a large scale, portions of a piston and the members of my improved ring-packing, Figure 1 represents one form in which these improvements may be embodied, and Fig. 2 represents another form. The cylinder is not shown, since the relationship of the piston and packing thereto is well known.

Referring first to Fig. 1, P, represents the piston. The piston groove, cut circumferentially in the piston, has as usual, the cylindrical inner wall $G^3$, and plane surfaces $G'$ and $G^2$. The packing members which make contact with the cylinder, are the base-ring B and the crown ring R. These are preferably formed with interfitting annular flanges $B'$ and $R'$, and when the rings B and R bear against the groove surfaces $G'$ and $G^2$, respectively, there should be a slight clearance at $c$ and $c'$ between each flange and the surface opposed thereto.

Interiorly, the base ring and crown ring are recessed, so as to form ledges $B^2$ and $R^2$. The surface V of the ledge $B^2$ is conical, and lies at all points of the circumference at an angle with the groove surface $G'$; likewise the surface W of the ledge $R^2$ is conical and at an angle with the groove surface $G^2$. The ledge $B^2$ terminates in a lip L, the surface of which is substantially parallel with the groove surface $G^2$. The surfaces of the recesses formed annularly in the ring-sections B and R, which lie between the aforesaid conical surfaces are substantially cylindrical.

The expanding ring S is a spring ring, lodged in the space between the walls of the packing ring sections and the inner wall $G^3$ of the piston groove. With reference to its minor axis, the cross section of the spring ring S is symmetrical, and this cross section, allowing for necessary clearance, is nearly as large as the cross section of the space in which the spring ring is lodged. Thus there is provided a maximum of spring-material, and therefore a maximum available ring-expanding force, with reference to the space behind, or within, the packing ring-sections. On the outer side of the spring ring S, it is rounded at the corners, so that the spring surface may bear on circles of tangency against the inclined surfaces V and W, as at $v$ and $w$. At its two edges the spring S is flat, as at $x$ and $y$. The dimension of the cross section of the spring S parallel with the axis of the piston is much greater than the shorter dimension which lies radially of the piston, so that the expanding ring is a flat-sectioned spring, adapted to exert its stress symmetrically against the packing ring sections.

One of the flat edges of the spring ring S bears squarely upon the flat surface of the lip L, as at $x$, the adjacent curved surface bears tangentially against the inclined surface V, as at $v$; at the other edge of the spring ring S, its curved surface bears tangentially against the inclined surface W, as at $w$. The components of force exerted on the base ring B and crown ring R, are represented by the parallelogram and directional arrows, at $v$ and $w$.

The effect of the spring ring S is, as indicated, to press the packing ring sections in a direction normal to the cylinder wall, as indicated at $b$ and $r$, and also in directions normal to the flat surfaces $G'$ and $G^2$ of the piston groove, as indicated at $t'$ and $t$. The sectional symmetry of the spring ring S insures an even division of the expansion and end thrust effects, and provides in large part for tight and permanent engagement between the ring sections B and R, the cylinder wall, and the plane surfaces at G' and G². While this engagement persists, there will be no appreciable leakage around the ring-packing.

The rapid reciprocation of the piston in a high speed engine tends to break this sealing contact between the ring sections and the groove surfaces, even in spite of the constant exertion of effort by the spring ring, which in itself, and by reason of its inertia of mass, resists the frequent and rapid reversals of movement to which the piston subjects it.

The structure of the base ring B, and its relationship with the crown ring R and expander S, constitutes a preventive of inertia-displacement of the members of the packing. Suppose the piston P to be reversing its movement from an up to a down stroke. The crown ring R is seated against the plane surface G², and is secure. The base ring B and spring ring S tend to move from surface G' or lip L. As to the spring ring S, when it is urged to move away from the lip L, its tangential relation with the cone-surface V tends to cramp the ring inward at w, to distort it from cylindrical to cone shape. Herein the spring itself furnishes, by reason of its abutment-relations, a strong factor of resistance to movement endwise of the piston. The tendency to distortion is also resisted by the square bearing of the flat edge at x on the lip L. As to the lip L and base ring B, the ring S can yield only by sliding on the lip L, and the only force available to produce such a movement is that provided by the wedge-action at w, which operates at great mechanical disadvantage on the remote point x.

As to the base ring B, this member can move away from the surface G' only on condition that the spring S be inwardly cramped at its farther edge, and again, the factors of resistance above mentioned come into play. The contact between base ring B and the cylinder securely holds the ring against distortion—represented by a tipping of its cross section, and the same is true of the crown ring R.

On reversal of piston movement from down to up-stroke the base ring B is securely seated; the crown ring R can move away from the surface G² only at the cost of distorting the spring S, as in the first situation, above analyzed.

Thus, under all conditions, the square seating of the spring S on the lip L of the base ring, enables the spring to perform substantially the functions of a strut between the ring sections; while the tangential contacts between the spring S and the two packing ring sections, at v and w produce the expansive and end thrust effects as well as though the square seat of the spring at x were absent. By forming the spring S with a symmetrical section, and flat edges at both x and y, either edge will serve to seat upon the lip L.

By reason of the combined flat seat and wedge contact of the spring S upon the base-ring B, and the supporting effect of the flat seat of the spring S through said spring, upon the crown-ring R, the assembled members, thus related and characterized, are flexibly adaptable to all expansive requirements and at the same time constitute as an aggregate, a substantially unyielding unit in respect to tendencies to movement longitudinally of the piston within the clearance limits provided.

Referring now to Fig. 2; the component members of the packing are here the same as those illustrated in Fig. 1, except for the structure and relationship of the interfitting flange portions of the packing ring sections. The flange F, formed on ring section R is here shown as the interior flange; flange F' formed on the base-ring B is the exterior flange; the crown ring R is undercut at f, at an angle, and the edge of the flange F' is beveled at f' so as to fit the undercut surface f, with a slight clearance between these conical surfaces when the ring sections are in their normal and intended positions. The meeting surfaces at j which are cylindrical, are intended to and normally will, lie in close contact.

This modified form of packing is intended particularly for use in engines such as two-cycle internal combustion engines, in which there are ports in the cylinder wall. There is some liability of a piston-ring springing outwardly into such a port, and the above described structure provides against this liability. If the ring-section R be subjected to this tendency, when lying in part in such a port-opening, the flange F' on the base-ring B will hold the ring section R, restraining the tendency on its part to bend or bulge into the port. If the ring-section B happens to be the one needing restraint, the undercut surface f, coöperating with the inclined surface f', will perform a similar restraining function, and retain the ring section B in proper relation to the piston and cylinder. In either alternative, the square abutment of the spring S upon the lip L will assist by reinforcing the ring section which is called on to perform the duty of keeping its companion ring section in place while abreast of a port opening in the cylinder wall.

What I claim and desire to secure by Letters Patent is:

1. In piston-packing, the combination, with a piston provided with a circumferential rectangular-sectioned groove, a base ring and a crown ring in the piston groove, with plane faces bearing, respectively, against the plane surfaces of the groove, and interiorly recessed to form ledges with surfaces inclined to the plane surfaces of the piston groove, the base ring having an interior lip substantially parallel with the adjacent plane surface of the piston groove, and a spring ring having curved surfaces, lodged in the space provided by said recesses, bearing tangentially on the inclined surfaces of the ring-ledges, and squarely on the lip of the base ring.

2. In piston-packing, the combination, with a piston provided with a circumferential rectangular-sectioned groove, a base ring and a crown ring in the piston groove, with plane faces bearing, respectively, against the plane surfaces of the groove, and with interfitting flanges, that of the base ring being the inner flange, and interiorly recessed to form ledges with surfaces inclined to the plane surfaces of the piston groove, the base ring having an interior lip subtantially parallel with the adjacent plane surface of the piston groove, and a spring ring having curved surfaces, lodged in the space provided by said recesses, bearing tangentially on the inclined surfaces of the ring-ledges, and squarely on the lip of the base ring.

3. In piston-packing, the combination with a circumferentially grooved piston, a base-ring and a crown-ring in the piston groove with plane faces bearing respectively against the plane surfaces of the groove, and inclined interior faces adapted to engage an expanding ring in wedge-relation therewith, the base ring provided also with a lip, and an expanding ring having wedge-bearing against said inclined inner faces of the base ring and crown ring, and seated on said lip.

4. In piston-packing, the combination with a circumferentially grooved piston, a base-ring and a crown ring on the piston groove, with plane faces bearing respectively against the plane surfaces of the groove, the crown ring having an inclined interior face adapted to engage an expanding ring in wedge-relation therewith, the base ring having a lip with a bearing surface substantially at right angles to the axis of the piston, and an expanding ring having wedge bearing against the crown ring and a square seat on said base-ring lip surface; the base ring and crown ring having interfitting flanges, the outer flange on one ring member engaging an undercut lip, formed on the other ring-member.

Signed by me at Boston, Massachusetts, this first day of May, 1920.

LEWIS C. MARSHALL.